C. BERGSTROM.
VEHICLE SPRING.
APPLICATION FILED JAN. 19, 1916.
1,329,695. Patented Feb. 3, 1920.
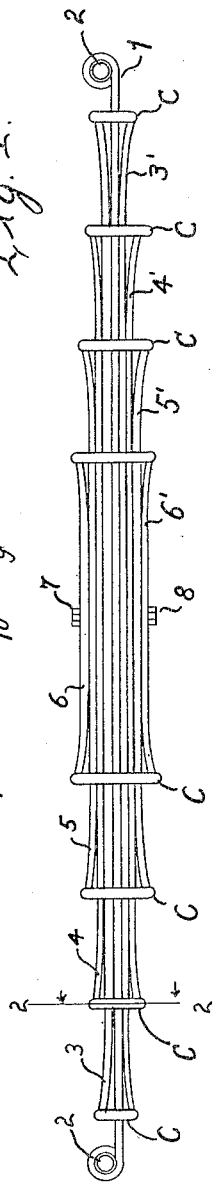
Fig. 1.
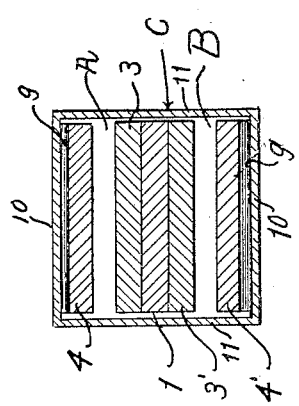
Fig. 2.
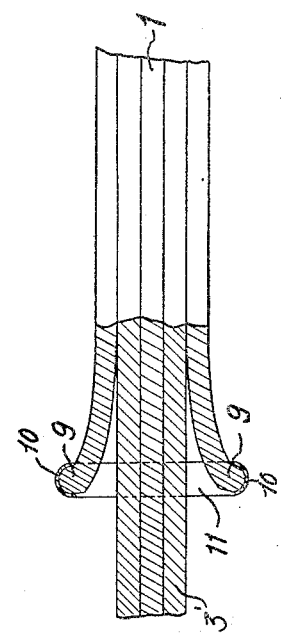
Fig. 3.
Inventor
Christian Bergstrom
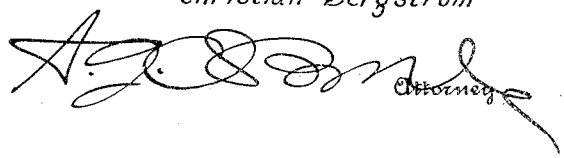

UNITED STATES PATENT OFFICE.

CHRISTIAN BERGSTROM, OF DENVER, COLORADO.

VEHICLE-SPRING.

1,329,695.  Specification of Letters Patent.  Patented Feb. 3, 1920.

Application filed January 19, 1916. Serial No. 72,988.

*To all whom it may concern:*

Be it known that I, CHRISTIAN BERGSTROM, a citizen of the United States, residing at Denver, in the county of Denver and State of Colorado, have invented certain new and useful Improvements in Vehicle-Springs, of which the following is a specification.

This invention has reference to a vehicle spring particularly adapted for use on such vehicles as automobiles and is so designed as to increase the comfort of riding in the vehicle whether the latter is loaded to its full capacity or only partially loaded.

The disadvantages of the springs such as are usually employed occur mostly from the fact that the same spring resistance is present when the vehicle is unloaded or only partially loaded as when the full load is carried. The result is that if the springs of the vehicle are designed to ride comfortably when the vehicle is loaded the passengers are uncomfortable when the vehicle is unloaded due to the stiff rebound action of the springs and, if designed to carry a partial or average load comfortably the springs are too weak for a full or over-load.

Therefore, one object of the present invention resides in the provision of a spring which, literally speaking, weighs its load, or in other words, is so designed as to automatically increase the spring resistance as the load increases or to automatically decrease the spring resistance as the load decreases.

A further object of the invention is to arrange a series of graduated sets of springs above and below a master-spring so that increased load deflecting the master-spring in either direction is compensated for by a graduated increase of resistance on opposite sides of the said master-leaf.

With the above and other objects in view, one specific embodiment of the invention which is shown in the accompanying drawing, will be hereinafter described.

In the drawings:

Figure 1 is a side elevation of the spring.

Fig. 2 is a transverse section on the line 2—2 of Fig. 1; and

Fig. 3 is a fragmentary view in side elevation showing, partly in section, the detail of one of the leaf connecting members.

*In detail.*

The spring, as herein illustrated, comprises a master leaf 1 having, at each end thereof, a suitable load connection 2 which may receive the shackle pins or the like, not shown.

Arranged on either side of the master leaf and centrally located with respect thereto are the series of graduated leaves A and B which may comprise any desired number and may be so arranged as to decrease in length as they recede from the master leaf 1. The series A comprises the leaves 3, 4, 5 and 6 decreasing in length in the order named and, likewise, the series B comprises the leaves 3′, 4′, 5′ and 6′ also decreasing in length in the order named. The terminals or ends of these leaves 3 to 6 and 3′ to 6′ are curved away from the master leaf 1 as shown. A bolt 7 fastened by a nut 8 passes centrally through all of the said leaves maintaining the same in proper assembled relation. In use the spring will be centrally located on the usual chair, not shown, and which forms a fulcrum therefor. Each leaf of the series A and B has formed on its ends the curvilinear bearing surface 9. Connecting the ends of the corresponding ends of the correspondingly placed leaves of each of the said series are the rectangular members C formed on two opposite sides into bearings 10 to receive the curvilinear surfaces 9, the other sides 11 acting to prevent lateral displacement of the leaves relative to each other.

The operation of the spring is as follows:

The leaves are so proportioned and tensioned that, when carrying the fixed or constant load the spring will stand in the normal position, as shown in the drawing. However, as the load is increased, the master leaf 1 will be deflected and first the connected leaves 3 and 3′, forming one pair will receive the master leaf 1 upon its terminals and then the pair 3—3′ will supplement and increase the resistance of the spring as a whole, the pairs 4—4′, 5—5′ and 6—6′ successively and gradually coming into play and thereby automatically increasing the spring resistance as the load increases and as the load diminishes the said pairs successively become more or less idle. Also, it is to be noted, that the shortest and stiffest pairs come into action last thus, at all times, insuring the efficiency of the spring which also acts as a shock absorber to gradually and effectively receive and absorb all shocks imparted thereto during travel of the vehicle.

While I have herein described a specific embodiment of the present invention, it is nevertheless to be specifically understood that the invention is not in any way limited thereby but that, in practice, such practical modifications may be resorted to as fall within the scope of the invention as defined in the appended claims.

I claim:

1. In combination with a master-spring, a plurality of supplementary springs arranged on opposite sides of said master-spring, and means connecting the said supplementary springs on one side of said master-spring with those on the other side thereof to form a series of graduated pairs of springs arranged to be successively brought into action by the deflection of said master-spring in either direction.

2. In combination with a master-spring, a plurality of supplementary springs arranged on opposite sides of said master-spring and having ends curved away from said master-spring, and means connecting the said supplementary springs on one side of said master-spring with those on the other side thereof to form a series of graduated pairs of springs arranged to be successively brought into action by the deflection of said master-spring in either direction.

3. In combination with a master-spring, a plurality of supplementary springs arranged on opposite sides of said master-spring, and means connecting the springs on one side with the corresponding springs on the other side to form a series of pairs of springs, said connecting means acting to successively bring the various pairs of springs into action upon the deflection of the master-spring in either direction.

4. In combination, a master spring and a plurality of supplementary springs arranged on opposite sides of said master spring in a series of pairs, said supplementary springs being so arranged in relation to each other and to said master spring as to cause said pairs to successively come into action upon deflection of the master spring in either direction.

In testimony whereof I have hereunto set my hand in the presence of two subscribing witnesses.

CHRISTIAN BERGSTROM.

Witnesses:
 CHARLES H. BELLER,
 R. L. ORVIS.